United States Patent [19]

Zand et al.

[11] Patent Number: 5,418,898
[45] Date of Patent: May 23, 1995

[54] MULTIDIMENSIONAL DATA DISPLAY SYSTEM AND METHOD

[75] Inventors: Mark Zand, Brighton; Shih-Lin Liu, Cambridge, both of Mass.; Joseph Haykov, New York, N.Y.; George W. Potts, Sr., Wellesley, Mass.

[73] Assignee: Occam Research Corporation, Wellesley, Mass.

[21] Appl. No.: 117,541

[22] Filed: Sep. 2, 1993

Related U.S. Application Data

[63] Continuation of Ser. No. 741,750, Aug. 7, 1991, abandoned.

[51] Int. Cl.⁶ .................................................. G06F 15/60
[52] U.S. Cl. ..................................................... 395/137
[58] Field of Search ............... 395/119, 146, 148, 161, 395/166, 134, 124

[56] References Cited

U.S. PATENT DOCUMENTS

| | | | |
|---|---|---|---|
| 4,667,308 | 5/1987 | Hayes et al. | 364/900 |
| 4,768,157 | 8/1988 | Chauvel et al. | 395/166 |
| 5,032,525 | 7/1991 | Lee et al. | 436/55 |
| 5,033,009 | 7/1991 | Dubnoff | 364/523 |
| 5,043,916 | 8/1991 | Kawai | 364/518 |
| 5,101,475 | 3/1992 | Kaufman et al. | 395/124 |
| 5,257,185 | 10/1993 | Farley et al. | 364/419.19 |

OTHER PUBLICATIONS

Microsoft® Works Reference, ©1989, pp. 186–187, 214–216.
De Maria et al, "Working with dBase Mac", 1988, pp. 417–423.

*Primary Examiner*—Heather R. Herndon
*Assistant Examiner*—Michael S. Smith
*Attorney, Agent, or Firm*—Iandiorio & Teska

[57] ABSTRACT

A data display system and method that provides for creation of multidimensional data displays in which the dimensions have one or more dimension elements and the display has display cells at dimension element intersections. Provisions are made for allowing rearrangement of display dimensions, reordering of display elements, and sorting within any dimension along with the maintenance of topological formulas during insertions, deletions, sorting and rearrangements. Further included is provision for support of both symmetrical and asymmetrical multidimensional spreadsheets.

36 Claims, 8 Drawing Sheets

10

| | A | B | C |
|---|---|---|---|
| 1990 Page A Chapter 1 | GNP | Population | |
| 1 Germany | 12 | 14 | |
| 2 France | | 16 | |
| 3 U.S. | | | |

| | A | B | C |
|---|---|---|---|
| 1989 Page B Chapter 1 | GNP | Population | |
| 1 Germany | 18 | | |
| 2 France | | | |
| 3 U.S. | | | |

Retrieving Display Cell Data
for Rearranged Cell B1

Cell Logical Index = B1
Cell Physical Index = A2
Cell Physical Address = ii
Cell Pointer for ii
Cell Data = C

| 100 | Topological Address Table | Table ID |
|---|---|---|
| | Physical Address of Cell I | ID = 0 |
| | Physical Address of Cell II | ID = 1 |
| | | ID = 2 |
| | | . |
| | | . |
| | | . |
| | | . |
| | | . |

Topological Formula of Cell III (Cell I + Cell II) is:
Cell III = ID0 + ID1

MULTIDIMENSIONAL DATA DISPLAY SYSTEM AND METHOD

This is a continuation of application Ser. No. 07/741,750, filed Aug. 7, 1991, now abandoned.

FIELD OF INVENTION

This invention relates to a multidimensional data display system and method that provides for rearrangement between or within a display dimension while supporting topological formulas and asymmetrical dimensions.

BACKGROUND OF INVENTION

Traditional spreadsheet programs allow the user to establish an array of data cells displayed in an x-y format. Although the dimensional axis can be labelled, there is no internal relationship between a dimension and the cells that form the dimensional display. Accordingly, these programs do not support the rearrangement of spreadsheet dimensions. Further, the user is not able to easily rearrange elements within a dimension, or sort the data. For example, to move a column of data in these spreadsheets, the user typically must save the data, establish a new blank column in the spreadsheet in the desired new column location, and then copy the saved data into that column. Accordingly, the spreadsheets are very inflexible, requiring the user to take great care before establishing the spreadsheet template to prevent the difficulty of changing the template after it is established.

More recently there have been developed relational spreadsheet programs that represent the data in the cells using the spreadsheet edges (symbolic representation). These relational spreadsheets are more flexible in that they allow the user to rearrange the spreadsheet dimensions and reorder dimension elements within a dimension. However, such flexibility is at the expense of other important features, such as the ability to support cell topological formulas in which cells are represented by data in two or more other cells on the spreadsheet; because these programs allow the user to change the locations of the cells contributing to the topological formula, they are not able to support topological formulas unless the dimensions and dimension elements remain fixed. Further, both the traditional and relational spreadsheets require the spreadsheet template to be symmetrical by requiring the secondary dimension to have the same number of elements per primary dimension element, and in the same order for each primary element. Accordingly, both approaches lack the flexibility required to be a truly effective spreadsheet tool.

SUMMARY OF INVENTION

It is therefore an object of this invention to provide a multidimensional data display system and method that is extremely powerful and easy to use.

It is a further object of this invention to provide such a system and method which has great flexibility in the form of display, even after the template has been established.

It is a further object of this invention to provide such a system and method that supports both symmetrical and asymmetrical spreadsheets.

It is a further object of this invention to provide such a system and method in which the user can rearrange display dimensions, reorder elements within a dimension, and sort the data along a dimensional element.

It is a further object of this invention to provide such a system and method that supports the use of cell topological formulas while still having the described flexibility.

This invention consists essentially of an improved multidimensional data display system and method which provides for the creation of a multidimensional data display in which each dimension has one or more dimension elements and associated display cells at dimension element intersections. Means are provided for rearranging display dimensions and the associated dimension elements and display cells to maintain the display cell and element association of the created data display on rearrangement. Further, there is a provision for reordering of dimension elements and the associated display cells within a display dimension to maintain the display cell and element association of the created data display for allowing alteration of the display format without compromise of the data integrity.

There may further be established a display dimension order array which is altered when the dimensions are rearranged to maintain an internal representation of the relationship between the display dimensions and those as originally established. There may further be included means for comparing the rearranged display cell locations to the altered location order array to resolve the created display cell corresponding to the rearranged display cell.

An array of created display cell data storage pointers may be established for use in a cell data storage. In that case, the dimensions may be rearranged by retrieving the pointers for each created display cell associated with a rearranged display cell to retrieve the correct data for display in the rearranged display cells.

The dimension elements may be reordered using stored representations of display cells associated with the dimension elements to be reordered. This representation may be called a hyperplane. The display location of the hyperplane may be changed within the dimension for reordering the element displays.

The invention may also provide for the establishment of additional display cells with display data derived from other display cells using topological formulas. Further, there may be included a provision for supporting symmetrical and asymmetrical displays in which provision is made for altering the number and/or order of secondary dimension elements in relation to the primary dimension elements.

Using the array of pointers, there may be provision for reordering display cells associated with the dimension element. This may be accomplished by resolving the storage pointers for the display cells to be reordered and changing the relationship between the resolved storage pointers and the display cells with which the pointers are associated.

DISCLOSURE OF PREFERRED EMBODIMENT

Other objects, features and advantages will occur to those skilled in the art from the following description of a preferred embodiment and the accompanying drawings, in which.

Figure 1:
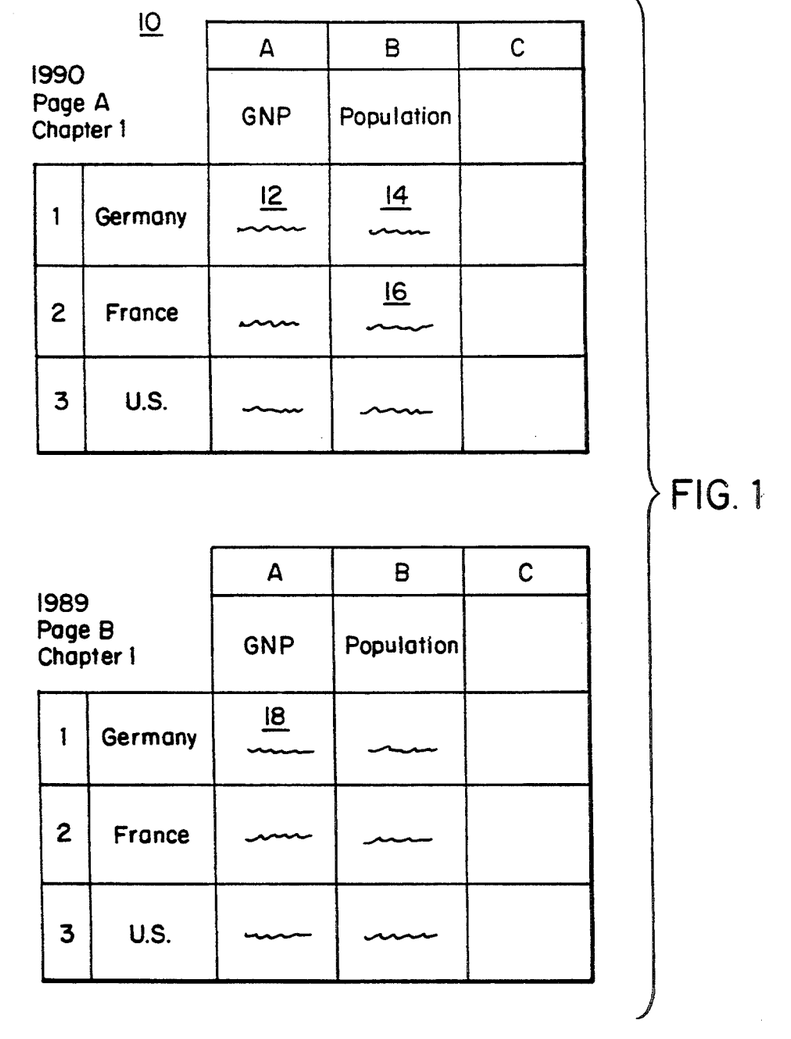
FIG. 1 is a representation of two pages of a four dimensional data display useful in describing the invention.

There is shown in FIG. 1 a representation of multidimensional data display or spreadsheet 10 that will be useful in illustrating the invention. Spreadsheet 10 is a four dimensional spreadsheet; one dimension is called a "chapter" one a "page" and then there are columns along the y axis and rows along the x axis, respectively. One shorthand designation for the dimensions is to use sequential number designations for the chapters, alphabetical designations for the pages and columns, and numerical representations for the rows, as shown in FIG. 1. Such shorthand designations are shown for convenience in explaining the invention, and are not actually displayed along with the spreadsheet.

Each dimension of the spreadsheet has one or more dimension elements. For example, the dimension along the x axis of spreadsheet 10 has elements labelled "Germany", "France", and "U.S.". The spreadsheet includes cells for holding data at the intersections of the dimensional elements, for example cells 12, 14 and 16 on page A, and cell 18 on page B. The cells in the spreadsheet as it is established may be referred to, then, by their address in relation to the dimensions, and the elements within the dimensions. Such an address scheme may be called a logical index, as it relates to an index of addresses that the operator sees on the screen as opposed to the physical index that is used internally by the system of this invention to maintain the necessary relationship between the cell data and the dimension elements to allow the dimensions and elements within the dimensions to be moved as explained below. The logical index for spreadsheet 10 may be established so that cell 12 is indexed as: Chapter 1: page A: column A, row 1, or 1:A:A1. Cell 16 would have the address: A:1:B2. Similarly, cell 18 would have the address: 1:B:A1. Spreadsheet 10 has empty column C that will be used below to describe features of the invention.

Figure 2:
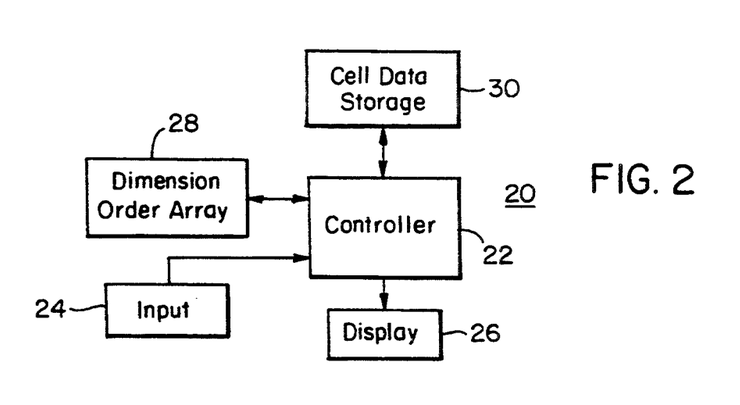
FIG. 2 is a block diagram of a system for accomplishing this invention.

System 20 for practicing the invention, FIG. 2, includes controller 20, input 24 that may be a keyboard and mouse, for example, and display 26, typically a CRT. System 20 employs dimension order array 28 and cell data storage 30 that maintain the established relationship between the cells and the dimensions and elements within the dimensions that allows the operator to rearrange display dimensions, reorder or change elements within a dimension, sort data within an element, maintain symmetrical and asymmetrical multidimensional formats, and maintain topological formulas during insertions, deletions, sorting and rearrangement.

The rearrangement of display dimensions accomplished with this invention is illustrated in FIGS. 3A through 3E. Simple two dimensional display 40, FIG. 3A, includes two columns and three rows and thus six data cells having data a, b, c, d, e and f therein. This invention provides for the ability for the user to rearrange display dimensions, for example to swap the columns and rows of display 40 to create display 40a now having three columns and two rows while maintaining the originally-established relationship between the cells and the display dimension elements necessary to allow the rearrangement without compromising the display data integrity. System 20, FIG. 2, maintains the relationship between the logical index of the data, which may be likened to an index of the actual current display, and a physical index of data, which is a means by which the system is able to keep track of the data for display in the cells to maintain the proper relationship between the dimension elements and the data associated therewith.

Figure 3A:
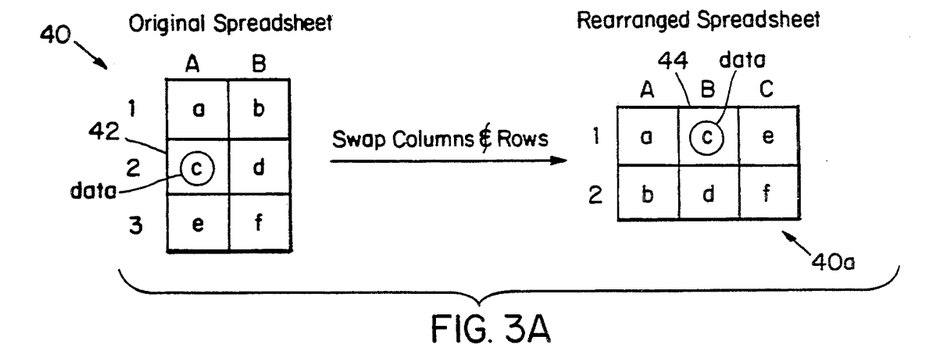
FIG. 3A is a simplified diagram of a two dimensional data display illustrating dimensional rearrangement according to this invention.
Figure 3B:
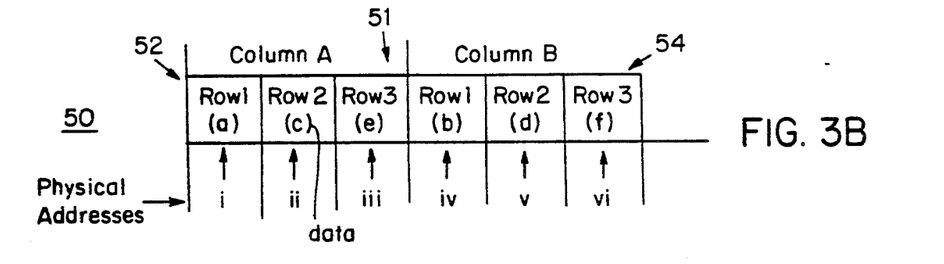
FIG. 3B is a representation of the cell pointer storage and associated cell data useful in describing the dimension rearrangement according to this invention.

Dimension order array 28 includes therein a linear array of pointers representing the data that is illustrated conceptually in FIG. 3B as array 50. Array 50 includes first array subset 52 and second array subset 54 both within set 51 which includes therein sufficient memory locations for one pointer for each cell of the single page of spreadsheet 40. Subset 52 represents the three pointers at physical addresses i, ii, iii, for the three cells at column A, rows 1, 2 and 3, respectively, having therein data a, c and e, respectively. Subset 54 for column B similarly includes pointers at physical addresses iv, v, vi, for column B rows 1 through 3, respectively, and pointing to data b, d and f, respectively. In the system of this invention, dimension array 50 would reside in array memory 28, FIG. 2, and the associated cell data would actually be stored in storage 30, FIG. 2. Thus, the six pointers of array 50 with physical addresses i through vi point to the data stored in cell data storage 30.

Figure 3C:
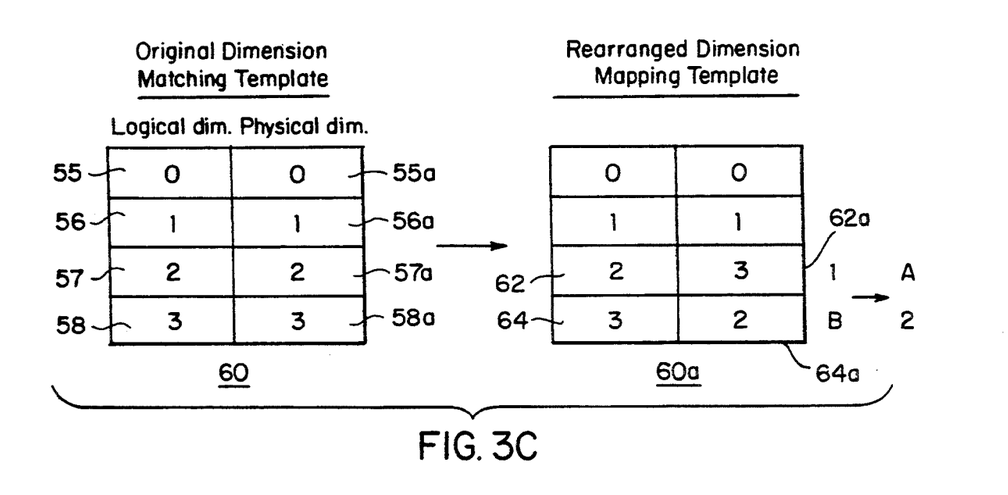
FIG. 3C is a representation of the dimension matching templates of this invention for the original and rearranged spreadsheets of FIG. 3A.

This invention provides for the necessary tracking between the display in its original and altered form using dimension matching templates as illustrated in FIG. 3C. Template 60 is a template representing the original spreadsheet 40 in which the logical dimensions are mapped to the physical dimensions. In other words, there is 1:1 correspondence between each of the logical or display dimensions and the physical dimensions or the internal representation of the dimensions used by the system to maintain the data integrity. Template 60 includes logical dimension elements 55 through 58 that represent, respectively, the chapter, page, column and row dimensions, mapped to physical dimensions 55a through 58a that likewise relate to the chapter, page, column and row dimensions, respectively. When the user swaps columns and rows as illustrated in FIG. 3A, the system tracks the relationship between the original spreadsheet dimensions and the rearranged dimensions using the dimension mapping template of FIG. 3C, in which the rearranged template includes the logical dimension numbers in the same order but has dimensions 2 and 3 reversed in the physical dimension side as shown by the relationship between template areas 62 and 62a, and 64 and 64a. In other words, the dimension numbers for the columns and rows in the physical dimension side of the template have been reversed.

Figure 3D:
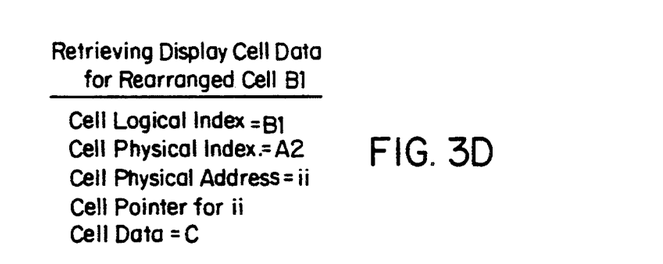
FIG. 3D is a list of steps in retrieving data for a display cell after rearrangement.
Figure 3E:
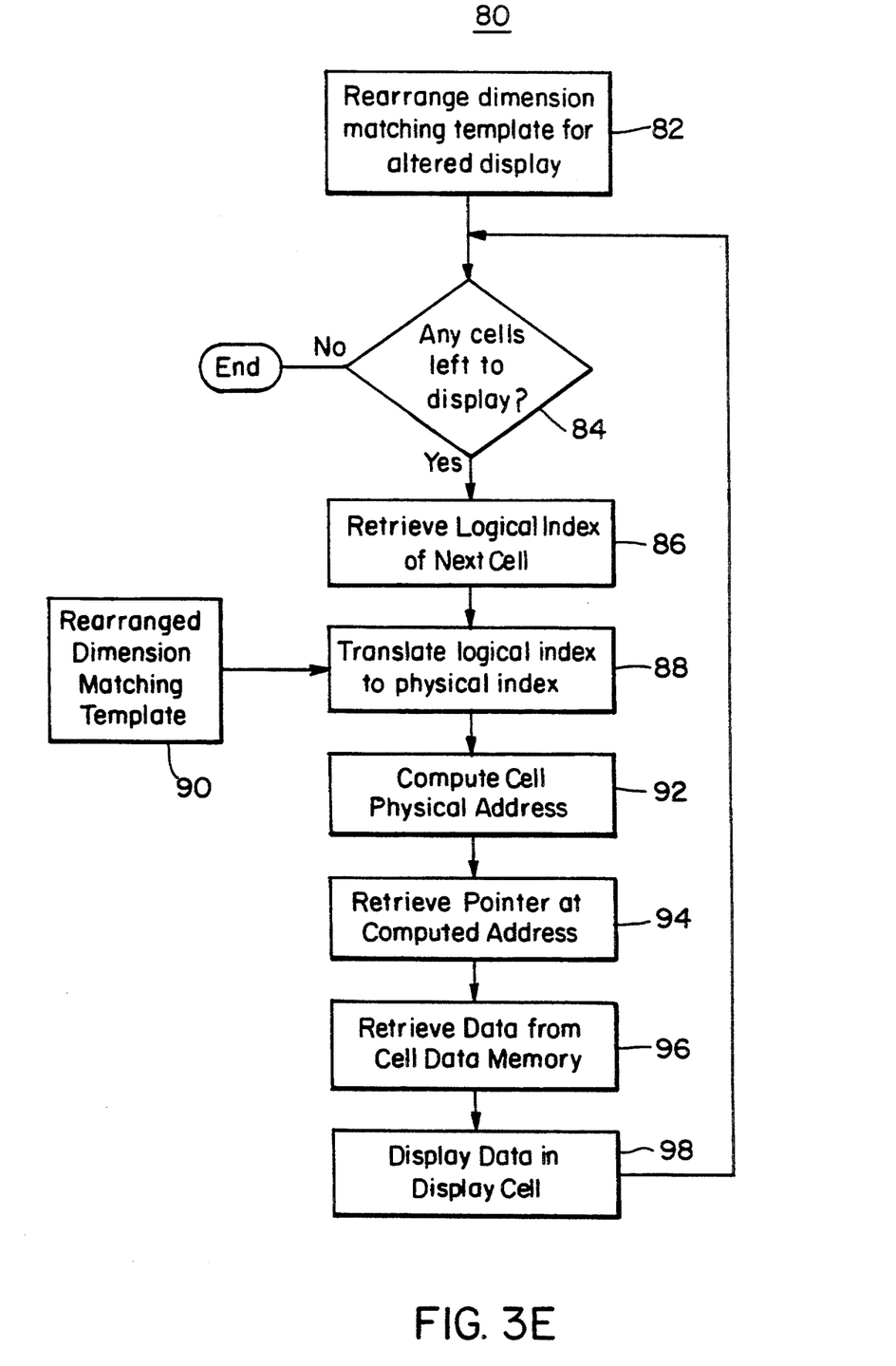
FIG. 3E is a flow chart of a routine according to this invention for accomplishing the dimension rearrangement of FIG. 3A.

To maintain the relationship between the cell data and the dimension elements, the system can apply the appropriate rearranged dimension mapping template to the logical index of a cell in the rearranged matrix to be displayed, as described in FIG. 3D for retrieval of display cell data "c" for rearranged cell 44 with a logical address B1 that had the logical address A2 in original spreadsheet 40. Application of template 60a to the cell with a logical index of B1 results in a cell physical index of A2 which as shown in FIG. 3B, the physical address of the pointer with this physical index is ii. Once the physical address is calculated, the pointer is retrieved and then used to retrieve the data from the corresponding cell data storage, which in this case is data c, which may then be displayed at logical index location B1 as shown in FIG. 3A.

FIG. 3 illustrates flow chart 80 for accomplishing this dimension rearrangement. The user first establishes a desire to rearrange the dimensions, for example the rearrangement shown in FIG. 3A. This may be accomplished for example by clicking the mouse on a column or the y dimension designation, and dragging the cursor to a row or the x dimension designation. The system then rearranges the dimension matching template for the altered display, for example as shown in FIG. 3C. If there are any cells left to be displayed in the rearranged matrix, step 84, the system retrieves the logical index of the next cell to be displayed, step 86, and translates the logical index to the cell physical index, step 88, using rearranged dimension matching template 90. The physical index is then used to compute the cell physical address, step 92, which is used to retrieve the pointer at the computed address, step 94, which then retrieves the appropriate data from the cell data memory, step 96. The data may then be displayed at the cell having the appropriate logical index, step 98.

Figure 4A:
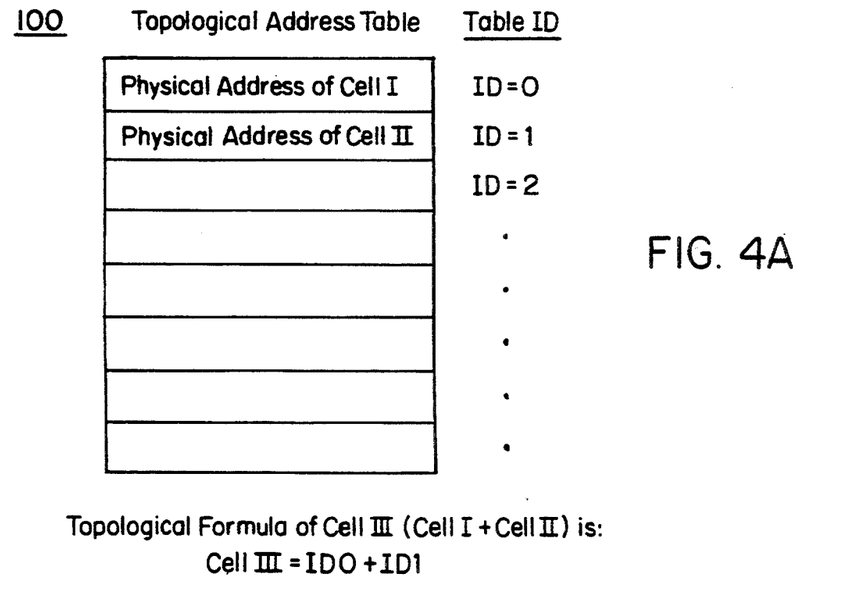
FIG. 4A is a representation of a topological address table of this invention.

This invention also provides the ability to establish and maintain cell topological formulas during the rearrangement and reordering. In doing so, the system establishes and maintains a topological address table such as table 100, FIG. 4A, that includes the physical address of each cell that contributes to a topological cell formula. For example, if cell III is established having a topological formula of cell I plus cell II, the system would maintain in table 100 the physical address of cell I and that of cell II. Each memory slot of the address table is provided with an ID number that is carried through the manipulations to maintain the relationship between cells with topological formulas and dimension elements as established in the original spreadsheet display.

Figure 4B:
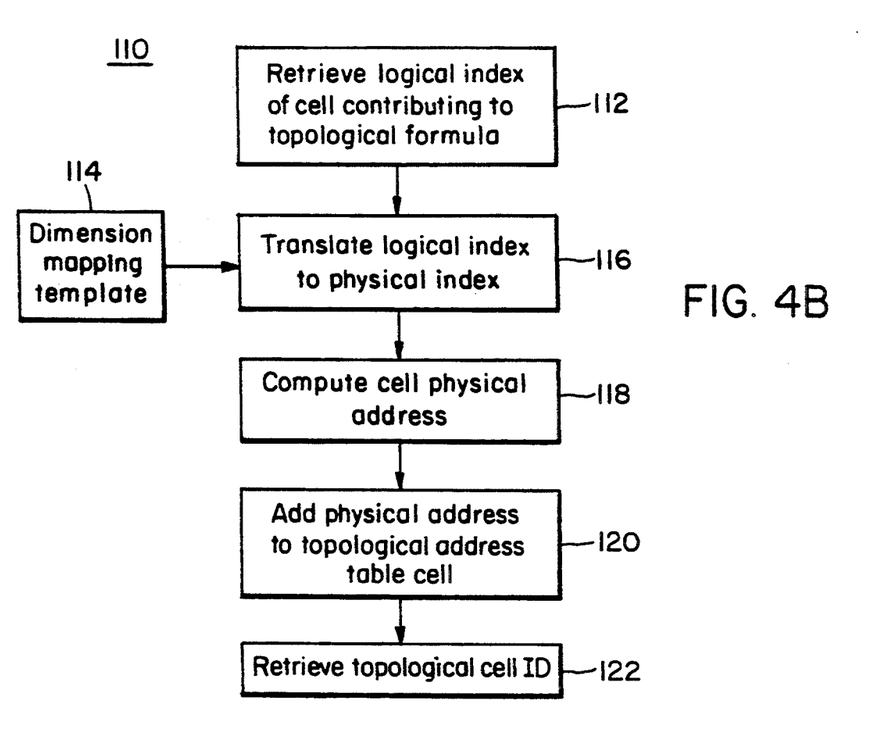
FIG. 4B is a flow chart of a routine of this invention for establishing the topological address table of FIG. 4A.

The physical address of a cell establishes the array pointer for the cell, which establishes the location of the data for the cell. Accordingly, when the array of cell pointers such as array 50, FIG. 3B, changes, the system must recalculate the physical addresses of the pointers to maintain the relationship between the logical index and the cell data. For example, if the user decides to expand a dimension, for example by inserting one or more members in a dimension, the linear pointer array memory must be expanded to accommodate the pointers for the additional cells. Flow chart 110, FIG. 4B, describes how this is accomplished. If the user adds a new column to a spreadsheet, for example column C, FIG. 1, and desires that one or more of the cells has for its data a topological formula to which two or more existing cells contribute, the system at step 112 would retrieve the logical index of a cell contributing to the topological formula, and using the dimension mapping template 114 would translate the logical index into the physical index, step 116, compute the physical address of the cell, step 118, and then add the physical cell address to the topological address table cell such as that shown in FIG. 4A. The ID number of that cell would then be retrieved for later use.

Figure 4C:
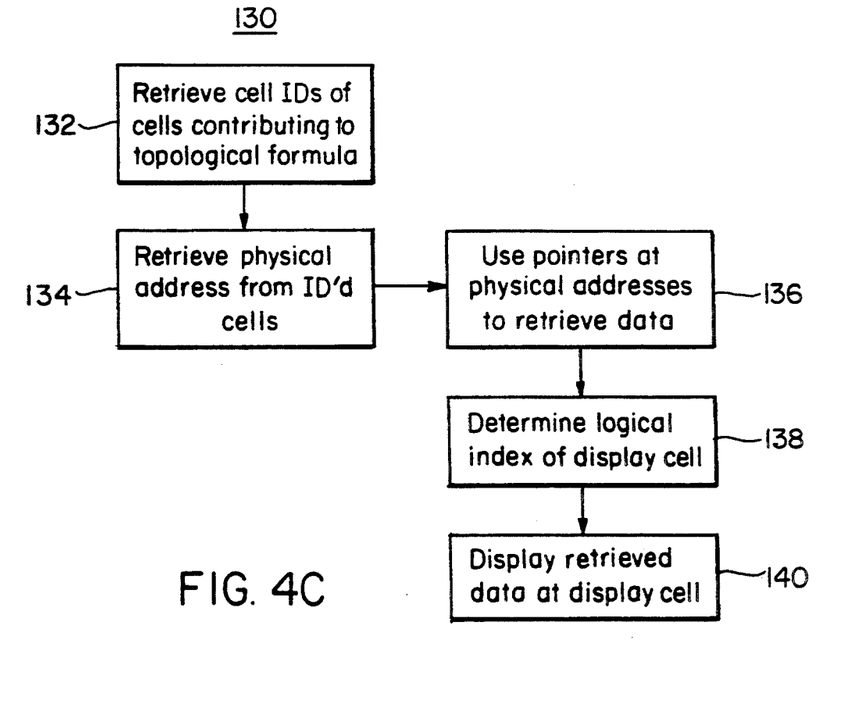
FIG. 4C is a flow chart of a routine of this invention for display of a topological formula when the spreadsheet template is changed.

To display the topological formula for a cell, or to display the data represented by the topological formula, flow chart 130, FIG. 4C, includes the steps of retrieving the identification numbers of the cells contributing to the topological formula and then retrieving the physical addresses of the identified cells of the address table, step 134. For display of the topological formula itself, the system would then compute the physical index of each cell contributing to the formula and translate that to the logical index using the dimension mapping template. For display of the data, the system uses pointers at the physical addresses retrieved from the identified cells, step 136, to retrieve the data, and then the logical index of the display cell would be determined as described above, step 138, and the data displayed at the cell with that logical index, step 140.

Figure 5A:
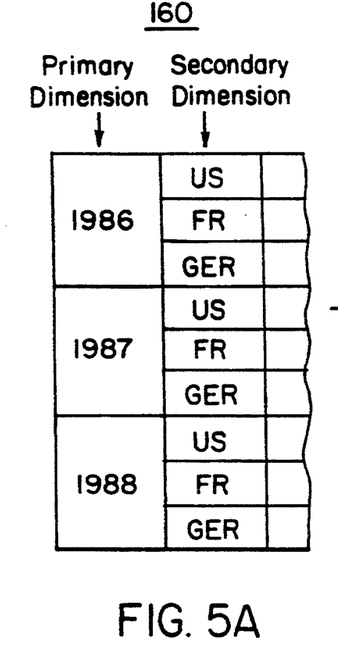
FIGS. 5A and 5B are illustrations of the edge designations for a symmetrical and asymmetrical spreadsheet.
Figure 5B:
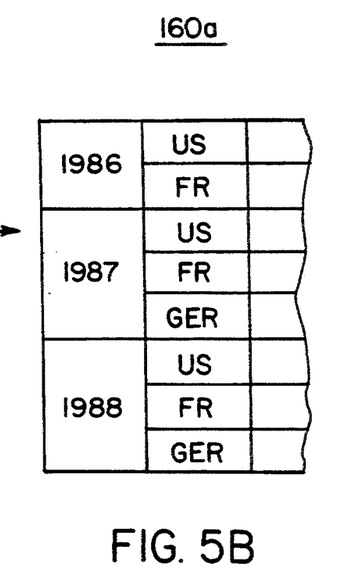

The system and method of this invention also provides support for asymmetrical multidimensional data displays. Symmetrical display 160, FIG. 5A, includes the same number and order of secondary dimensions for each primary dimension element. Asymmetrical display 160a, FIG. 5B, does not have such a relationship between the secondary and primary dimensions. As can be seen, the secondary dimension "GER" has been removed from association with primary dimension element "1986" so that there are only two secondary dimension elements associated with that first primary dimension element, while the other primary dimension elements still have associated therewith the original three secondary dimension elements in the appropriate order.

Figure 5C:
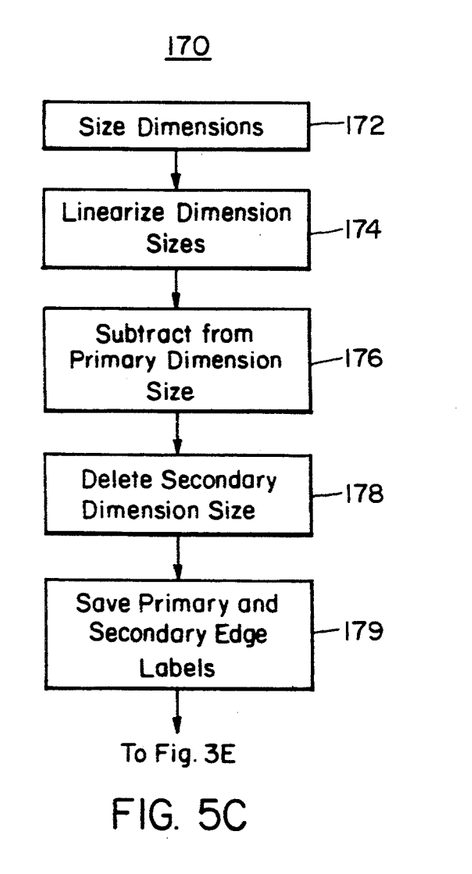
FIG. 5C is a flow chart of a routine of this invention for support of the asymmetrical spreadsheet of FIG. 5B.

To support such symmetrical spreadsheets, the system and method of this invention includes routine 170, FIG. 5C, which begins by sizing the primary and secondary dimensions. For example, spreadsheet 160, FIG. 5A, would be sized as having three primary and three secondary dimension elements. When the user desires to establish an asymmetrical spreadsheet, the system linearizes the original dimension sizes, step 174. Since the secondary dimension is the dimension that is changed in FIG. 5B, the linearization would linearize by establishing all of the nine primary and secondary dimensions as "primary" dimensions with a single "secondary" dimension. The number of secondary dimensions deleted in the asymmetrical spreadsheet would then be subtracted from the "primary" dimension size, step 176, and the "secondary" dimension size would be deleted, step 178, to leave a subtracted linearized sizing of eight. The primary and secondary edge labels are then saved, step 179, so that the system can track which of the nine original dimension elements has been eliminated and is not to be displayed. The system would then proceed to FIG. 3E for display of the cell data.

Figure 6A:
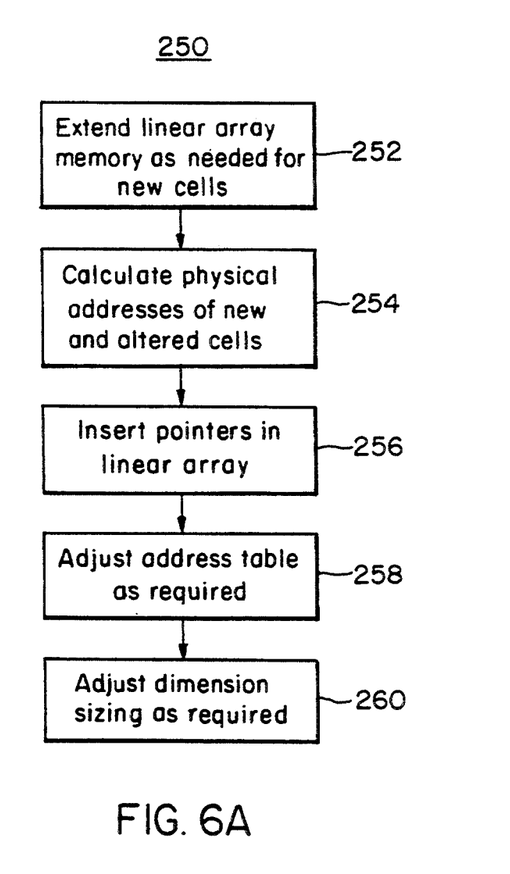
FIG. 6A is a flow chart of a routine of this invention for insertion and deletion of dimensional member(s)

FIG. 6A illustrates flow chart 20 for accomplishing insertion or deletion of one or more elements within a dimension. For insertion, the first step, step 250, is to extend the linear pointer array memory as needed to accommodate pointers for the new cells. Then, the physical addresses of the new cells and any cells that are being altered (moved) is calculated, step 254, and the appropriate number of new pointers is inserted in the linear pointer array, step 256. Since the physical addresses of existing cells will move if the insertion causes the movement of existing data, the physical addresses in the topological address table are adjusted as required, step 258, and the dimension sizing is adjusted as required, step 260.

Figure 6B:
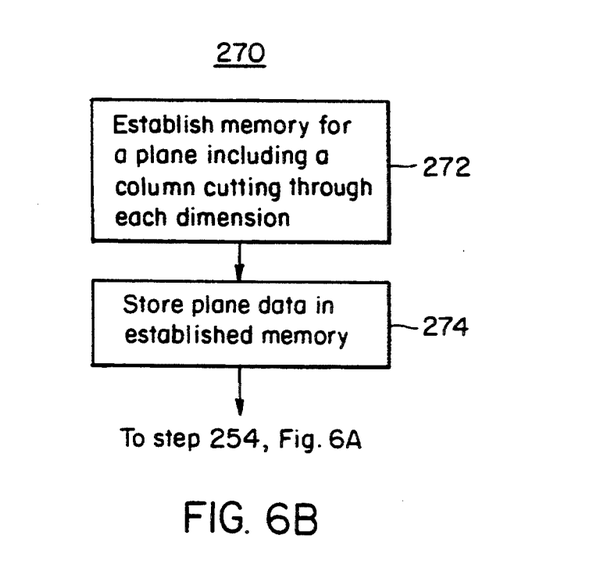
FIG. 6B is a flow chart of additional steps to those of FIG. 6A for moving a dimensional member.

For the simple movement of an element such as a column, as illustrated in FIG. 6B, the system establishes a memory for a plane (hyperplane) that a cuts through each dimension along the element chosen to be moved, a column in this example. The data for the cells in this plane are then stored in an established memory, and operation proceeds to step 254, FIG. 6A. Step 256 would not be required in a movement operation since the size of the linear array will not change.

Figure 7:
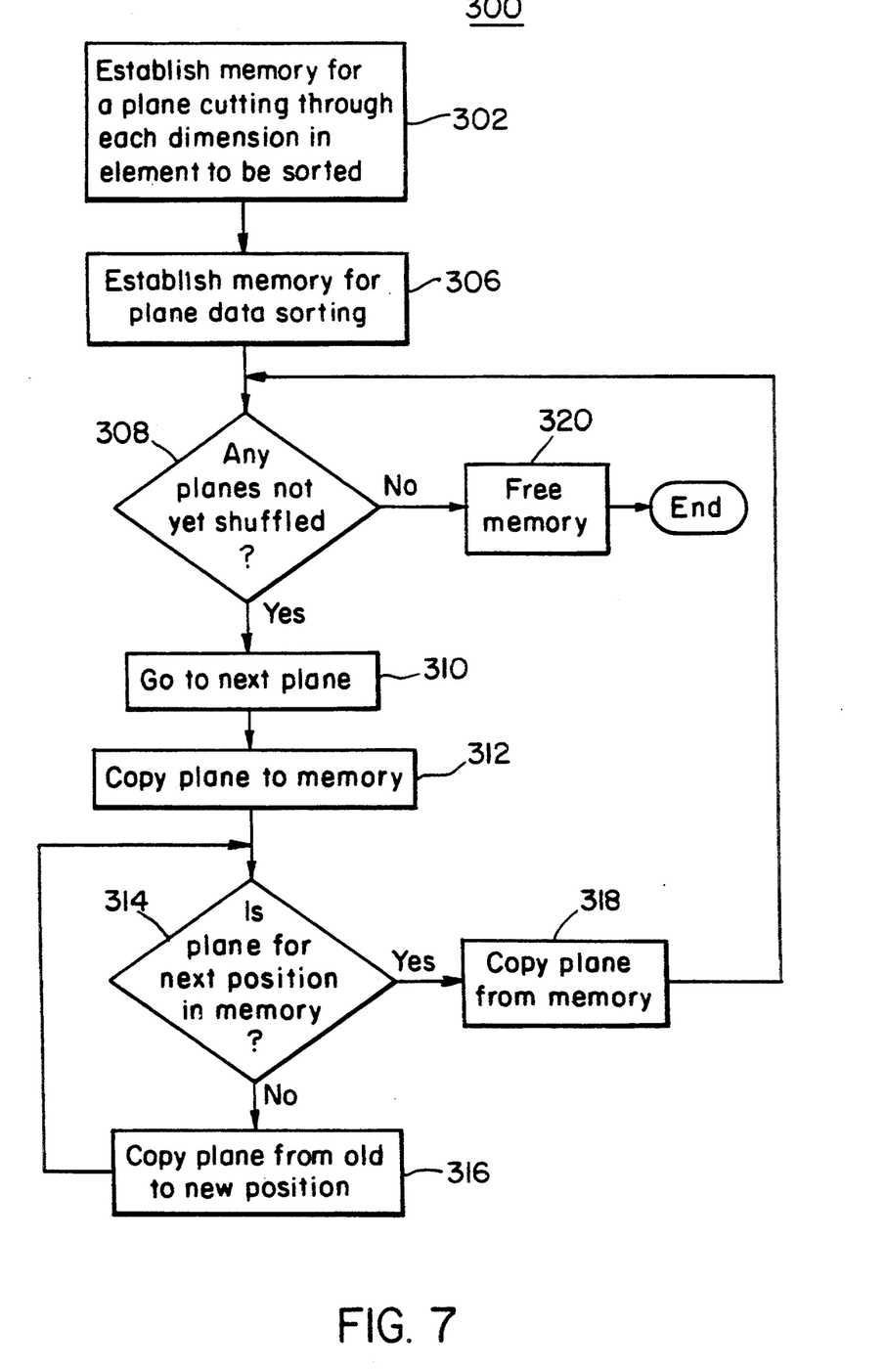
FIG. 7 is a flow chart of a routine of this invention for sorting data in a dimensional element according to this invention.

FIG. 7 illustrates a flow chart for a sorting operation in which the system and method provides for the ability to sort the data within a dimension element, for example to sort numerically or alphabetically. In the first step, step 302, the system establishes sufficient memory for storage of a hyperplane cutting through each dimension along the element to be sorted. For example, if the matrix included the "United States" as a dimension element of the dimension "Countries", and had data associated with that element, a single hyperplane would include all of the data associated with the U.S. If the sort were taking place along the "countries" dimension, say to sort alphabetically, there would be established one hyperplane including all of the data associated with each country (dimension element). Another memory is then established to keep track of the sorts that have taken place on the planes, step 306. This sort routine needs only enough memory to store data for one hyperplane due to the following steps. In step 308, if there are planes remaining that have not been shuffled (reordered), the system moves to that next plane, step 310, and copies it to memory, step 312. At step 314 the system then determines which plane is to be placed in the next sorted position. For example, in the example where the sort is taking place alphabetically along the "Countries" dimension, the plane in the first position would be that associated with the country name closest to the beginning of the alphabet. If the plane for the next position is not in the established memory, the plane is copied from its old position to its new position, step 316, and operation loops back to step 314. Once this shuffling arrangement comes across the plane in memory, the plane is copied from memory, step 318, and the operation returns to step 308. When there are no planes remaining to be shuffled, the memory is freed, step 320, and the operation ends.

Figure 8:
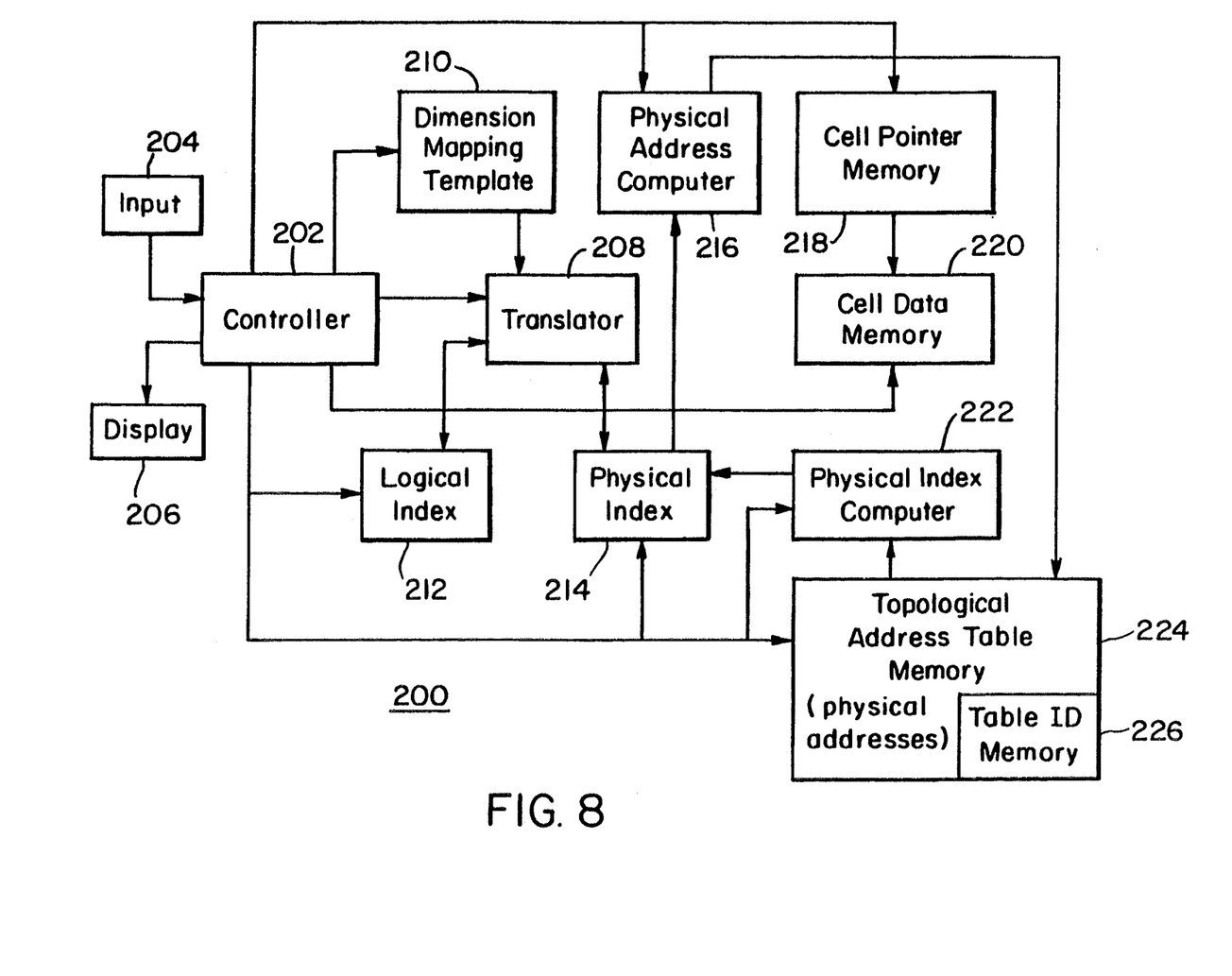
FIG. 8 is a more detailed block diagram of the system and method according to this invention.

FIG. 8 illustrates a more detailed system 200 according to this invention that provides for all the features described herein. Along with the controller, input and display 202, 204, and 206, respectively, the system includes a translator function 208 that translates back and forth between a cell logical index 212 and physical index 214 using dimension mapping template 210 as described above. The physical index may be used to calculate the physical address with computer 216, and the physical address is used to retrieve the pointer at that address from memory 218. The pointer is then used to retrieve cell data from memory 220. The physical address may also be provided to the topological address table memory 224 having an address table ID memory 226. Physical index computer 222 may employ the physical addresses in table 224 to compute the physical indexes 214 as described above.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. An improved multidimensional data display system, comprising:
    means for creating a multidimensional data display having at least three dimension axes, each dimension axis having one or more dimension elements, the display having associated display cells having display locations at dimension element intersections;
    means for rearranging display dimension axes and the associated dimension elements and display cells from a first display dimension axis to a second display dimension axis, resulting in rearranged display cell locations, to maintain the display cell and element association of the created data display on rearrangement, said means for rearranging enabling rearrangement of the display dimension axes and the associated dimension elements and display cells between three or more display dimension axes; and
    means for reordering elements and the associated display cells within a display dimension axis to maintain the display cell and element association of the created data display for allowing alteration of the display format without compromise of the data integrity.

2. The improved data display system of claim 1 in which said means for creating includes means for establishing a created display dimension order array.

3. The improved data display system of claim 2 in which said means for rearranging includes means for altering said display dimension order array.

4. The improved data display system of claim 3 in which said means for rearranging further includes means for comparing said rearranged display cell locations to said altered dimension order array for resolving which created display cell corresponds to said rearranged display cell.

5. The improved data display system of claim 1 in which said means for creating includes means for establishing an array of created display cell data storage pointers.

6. The improved data display system of claim 5 in which said means for rearranging includes means for retrieving the pointers for each created display cell associated with a rearranged display cell to retrieve the correct data for display in the rearranged display cells.

7. The improved data display system of claim 5 further including means for reordering display cells associated with a dimension element.

8. The improved data display system of claim 7 in which said means for reordering includes means for resolving the storage pointers for the display cells to be reordered.

9. The improved data display system of claim 8 in which said means for reordering further includes means for changing the relationship between the resolved storage pointers and the display cells with which the pointers are associated.

10. The improved data display system of claim 1 in which said means for reordering includes means for storing a representation of the display cells associated with the dimension elements to be reordered.

11. The improved data display system of claim 10 in which said means for reordering further includes means for changing within the dimension the display location of the display cells associated with the display dimensions to be reordered for reordering the dimension elements and associated display cells.

12. The improved data display system of claim 1 further including means for establishing additional display cells with display data derived from other display cells.

13. The improved data display system of claim 1 in which said multidimensional data display includes on one display axis a primary and secondary dimension, with one or more secondary dimension elements associated with each primary dimension element.

14. The improved data display system of claim 13 further including means for altering the number of secondary dimension elements for at least one primary dimension element.

15. The improved data display system of claim 13 further including means for altering the order of the secondary dimension elements for at least one primary dimension element.

16. An improved multidimensional data display system, comprising:
   means for creating a multidimensional data display having at least three dimension axes, each dimension axis having one or more dimension elements, the display having associated display cells at dimension element intersections;
   means for establishing additional display cells with the display data derived from other display cells; and
   means for rearranging display dimension axes and the associated dimension elements and display cells from a first display dimension axis to a second display dimension axis to maintain the display cell and element association of the created data display on rearrangement, said means for rearranging enabling rearrangement of the display dimension axes and the associated dimension elements and display cells between three or more display dimension axes.

17. An improved multidimensional data display system, comprising:
   means for creating a multidimensional data display having at least three dimension axes, each dimension axis having one or more dimension elements with at least one display axis having primary and secondary dimensions, with one or more secondary dimension elements associated with each primary element, the display having display cells at dimension element intersections;
   means for altering the number of secondary dimension elements and the secondary dimension order for at least one primary dimension element; and
   means for rearranging display dimension axes and the associated dimension elements and display cells from a first display dimension axis to a second display dimension axis to maintain the display cell and element association of the created data display on rearrangement, said means for rearranging enabling rearrangement of the display dimension axes and the associated dimension elements and display cells between three or more display dimension axes.

18. An improved multidimensional data display system, comprising:
   means for creating a multidimensional data display having at least three dimension axes, each dimension axis having one or more dimension elements, with at least one display axis having primary and secondary dimensions, with one or more secondary dimension elements associated with each primary element, the display having display cells at dimension element intersections;
   means for altering the number of secondary dimension elements or the secondary dimension order for at least one primary dimension element;
   means for rearranging display dimension axes and the associated dimension elements and display cells from a first display dimension axis to a second display dimension axis to maintain the display cell and element association of the created data display on rearrangement, said means for rearranging enabling rearrangement of the display dimension axes and the associated dimension elements and display cells between three or more display dimension axes;
   means for establishing additional display cells with display data derived from other display cells; and
   means for reordering elements within a display dimension axis and the associated display cells to maintain the display cell and element association of the created data display.

19. An improved multidimensional data display method, comprising:
   creating a multidimensional data display having at least three dimension axes, each dimension axis having one or more dimension elements, the display having associated display cells having display locations at dimension element intersections;
   rearranging display dimension axes and the associated dimension elements and display cells from a first display dimension axis to a second display dimension axis, resulting in rearranged display cell locations, to maintain the display cell and element association of the created display on rearrangement, said rearranging enabling rearrangement of the display dimension axes and the associated dimension elements and display cells between three or more display dimension axes; and
   reordering elements within a display dimension axis and the associated display cells to maintain the display cell and element association of the created data display.

20. The improved data display method of claim 19 in which creating a data display includes establishing a created display dimension order array.

21. The improved data display method of claim 20 in which rearranging display dimensions includes altering the display dimension order array.

22. The improved data display method of claim 21 in which rearranging display dimensions further includes comparing said rearranged display cell locations to the altered dimension order array for resolving which created display cell corresponds to the rearranged display cell.

23. The improved data display method of claim 19 in which creating a data display includes establishing an array of created display cell data storage pointers.

24. The improved data display method of claim 23 in which rearranging display dimensions includes retrieving the pointers for each created display cell associated with a rearranged display cell to retrieve the correct data for display in the rearranged display cells.

25. The improved data display method of claim 23 further including reordering display cells associated with a dimension element.

26. The improved data display method of claim 25 in which reordering includes resolving the storage pointers for the display cells to be reordered.

27. The improved data display method of claim 26 in which reordering further includes changing the relationship between the resolved storage pointers and the display cells with which the pointers are associated.

28. The improved data display method of claim 19 in which reordering elements includes storing a representation of the display cells associated with the dimension elements to be reordered.

29. The improved data display method of claim 28 in which reordering elements further includes changing within the dimension the display location of the display cells associated with the display dimensions to be reordered for reordering the dimension elements and associated display cells.

30. The improved data display method of claim 19 further including establishing additional display cells with display data derived from other display cells.

31. The improved data display method of claim 19 in which the multidimensional data display includes on one display axis a primary and secondary dimension, with one or more secondary dimension elements associated with each primary dimension element.

32. The improved data display method of claim 31 further including altering the number of secondary dimension elements for at least one primary dimension element.

33. The improved data display method of claim 31 further including altering the order of the secondary dimension elements for at least one primary dimension element.

34. An improved multidimensional data display method, comprising:

creating a multidimensional data display having at least three dimension axes, each dimension axis having one or more dimension elements, the display having associated display cells at dimension element intersections;

establishing additional display cells with display data derived from other display cells; and rearranging display dimensions axes and the associated dimension elements and display cells from a first display dimension axis to a second display dimension axis to maintain the display cell and element association of the created data display on rearrangement, said rearranging enabling rearrangement of display dimension axes and the associated dimension elements and display cells between three or more display dimension axes.

35. An improved multidimensional data display method, comprising:

creating a multidimensional data display having at least three dimension axes, each dimension axis having one or more dimension elements, with at least one display axis having primary and secondary dimensions, with one or more secondary dimension elements associated with each primary element, the display having display cells at dimension element intersections;

altering the number of secondary dimension elements or the order of secondary elements for at least one primary dimension element; and rearranging display dimension axes and the associated dimension elements and display cells from a first display dimension axis to a second display dimension axis to maintain the display cell and element association of the created data display on rearrangement, said rearranging enabling rearrangement of display dimension axes and the associated dimension elements and display cells between three or more display dimension axes.

36. An improved multidimensional data display method, comprising:

creating a multidimensional data display having at least three dimension axes, each dimension axis having one or more dimension elements, with at least one display axis having primary and secondary dimensions, with one or more secondary dimension elements associated with each primary element, the display having display cells at dimension element intersections;

altering the number of secondary dimension elements or the order of secondary elements for at least one primary dimension elements;

rearranging display dimension axes and the associated dimension elements and display cells from a first display dimension axis to a second display dimension axis to maintain the display cell and element association of the created data display on rearrangement, said rearranging enabling rearrangement of display dimension axes and the associated dimension elements and display cells between three or more display dimension axes;

establishing additional display cells with display data derived from other display cells; and reordering elements within a display dimension axis and the associated display cells to maintain the display cell and element association of the created data display.

* * * * *